Figure 1:
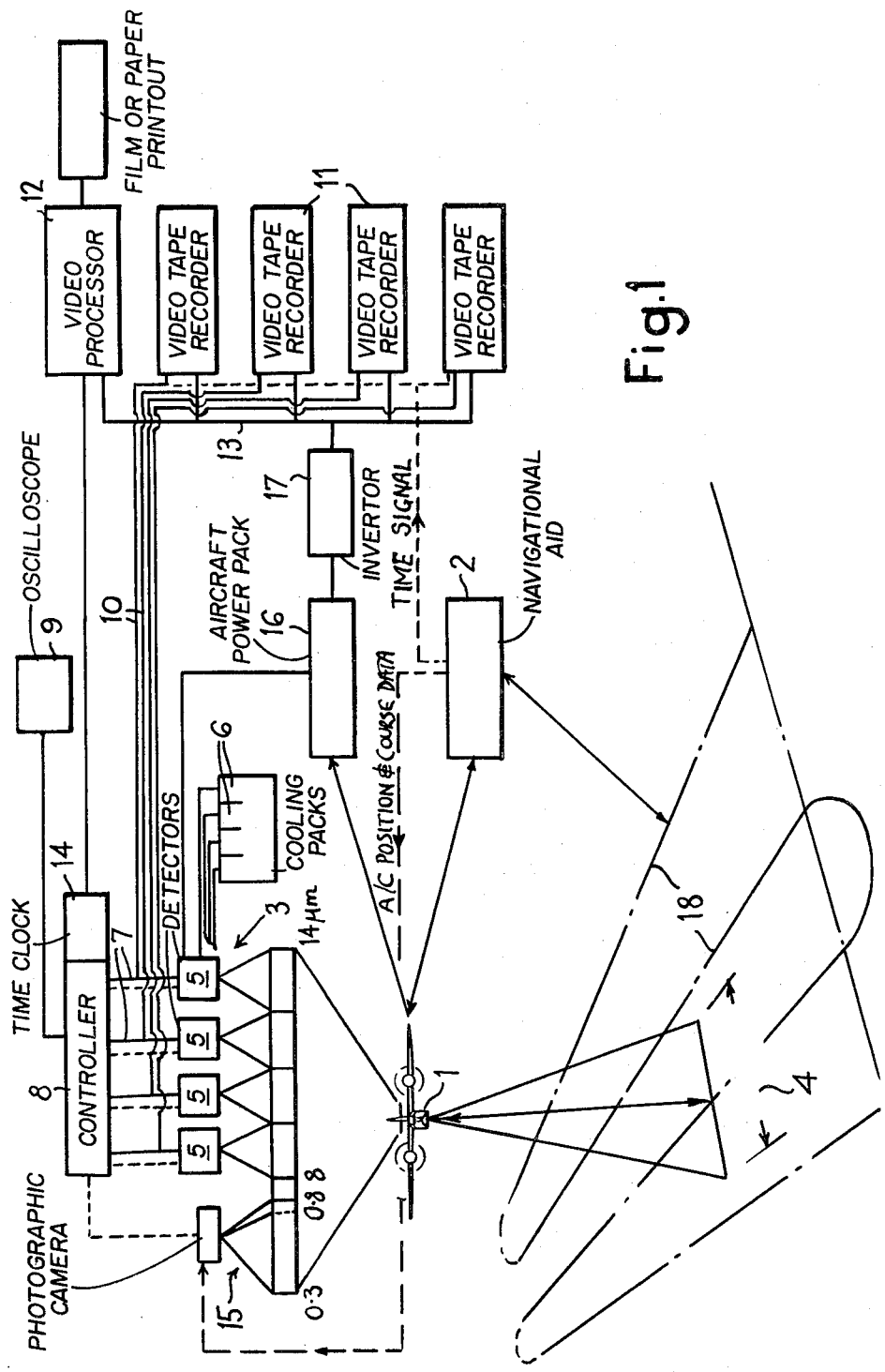

United States Patent [19]

Hough

[11] 4,421,981

[45] Dec. 20, 1983

[54] METHOD AND APPARATUS FOR CONDUCTING REMOTE SURVEYS OF THE EARTH'S CRUST

[75] Inventor: George H. Hough, Cornwall, England

[73] Assignee: Forthstar Limited, Cornwall, England

[21] Appl. No.: 258,256

[22] Filed: Apr. 28, 1981

[30] Foreign Application Priority Data

Apr. 29, 1980 [GB] United Kingdom ................. 8014026

[51] Int. Cl.³ ........................... G01V 5/00; G01J 1/00
[52] U.S. Cl. .................................... 250/253; 250/340; 250/342
[58] Field of Search ............... 250/253, 330, 332, 334, 250/341, 342, 349; 324/330, 332, 344; 356/2, 51

[56] References Cited

U.S. PATENT DOCUMENTS 3,715,591  2/1973  Gull ..................................... 250/253
3,725,662  4/1973  Merkel ................................ 250/253
4,302,108  11/1981 Timson ................................ 250/341

*Primary Examiner*—Janice A. Howell
*Attorney, Agent, or Firm*—Biebel, French & Nauman

[57] ABSTRACT

The present invention concerns a method for remotely surveying the earth's surface. The method comprises the steps of advancing a plurality of electromagnetic scanning devices (3) along a known path at a predetermined height and velocity above the earth's surface, simultaneously scanning a track (4) of predetermined width on the earth's surface with said scanning devices, detecting with the scanning devices electromagnetic radiation received from the earth's crust in the electromagnetic spectrum, each scanning device responding to a different spectral range within the electromagnetic spectrum, and producing a film record (20) from each scanning device corresponding to the intensity of the radiant energy detected by the scanning device within its spectral range. To enable analysis of the film records so produced it is essential that they are in register so that each film record is scanned by a flying spot scanner (21), the individual rasters of the flying spot scanners being controlled by controls (24) to achieve registration of the images of the film records (20).

10 Claims, 2 Drawing Figures

METHOD AND APPARATUS FOR CONDUCTING REMOTE SURVEYS OF THE EARTH'S CRUST

The present invention relates to a method and apparatus for conducting remote surveys, such as geological surveys, of the earth's crust and, more particularly, to a method and apparatus for conducting such remote surveys to provide data for multi-channel spectral analysis.

The earth's crust materials, such as minerals, rocks and soils, exhibit characteristic reflectance and emittance features throughout the 0.4–14.0 $\mu$m waveband of the electromagnetic spectrum, most of which is beyond the upper limit of photographic film and the limit of the human eye. It is known that the 8.0–14.0 $\mu$m thermal infra-red region of the spectrum contains an even greater amount of compositional information in the form of emittance minima caused by interatomic vibrations and that the earth's crust materials may be differentiated from one another by the spectra of their radiation emissions in this thermal infra-red region. They have so-called individual "spectral signatures," incorporating their emittance minima, which are most distinctive in this region. For example, emittance minima of granite, pumice, quartz basalt, basalt and farmington chondrite occur respectively in the regions of the following wavelengths, namely, 8.80 $\mu$m, 9.3 $\mu$m, 10.40 $\mu$m and 11.3 $\mu$m, and such rocks can be identified by detecting these individual emittance minima.

Multi-channel spectral analysis is a technique which can be used to analyse and classify data simultaneously obtained in a number of wavebands to determine certain characteristics of the earth's crust. The analysis may be carried out using analogue techniques or, if the basic data can be provided in digital form, by the use of digital computers.

Data as to the geological composition of the earth's crust is currently obtainable, for example, from the Landsat C satellite and is basically supplied as digital signals transmitted from the satellite to ground stations. The satellite transmits four signals derived from bandwidths located in the visible and near infra-red regions of the electromagnetic spectrum and up to 1 $\mu$m in wavelength. These signals have been used to analyse some earth or ground formations by using both analogue and digital techniques. The ground resolution of the images represented by the satellite signals is approximately 250 ft. sq. The differences in the spectral signatures of various earth materials in the short wavelength bands detected by the satellite are such that fine adjustments are necessary together with a high degree of skill to obtain confirming evidence that the ground characteristics merit detailed geological surveys. However, progress in the analysis of this data has shown that faults and discontinuities in the earth's crust can be identified.

As mentioned above, the spectral signatures of the individual materials making up the earth's crust are most distinctive in the 8–14 $\mu$m waveband of the thermal infra-red region of the spectrum. In order to make use of the apparatus available for carrying out multi-spectral analysis, a number of images of the earth's crust in different segments or channels of this waveband would have to be simultaneously obtained. The detectors used in such equipment commonly comprise cadmium mercury telluride material which requires cooling to liquid air temperature to obtain good sensitivity. Equipments developed and operating in this broad band are typically thermal imagers and line scanners. However problems have arisen in obtaining a sufficiently good signal-to-noise ratio and in providing accurate registration between the various channels.

It is an object of the present invention to provide a method and apparatus for remotely surveying the geological composition of the earth's crust and for simultaneously producing a plurality of signals identifying the emission from the earth's surface in different spectral ranges of the thermal infra-red region of the spectrum for the purposes of multispectral analysis.

From one aspect, the present invention consists in a method for remotely surveying the earth'crust, comprising the steps of advancing a plurality of electromagnetic scanning devices along a known path at a predetermined height and velocity above the earth's surface, simultaneously scanning a track of predetermined width on the earth's surface with said scanning devices, detecting with the scanning devices electromagnetic radiation received from the earth's crust in the electromagnetic spectrum, each scanning device responding to a different spectral range within the electromagnetic spectrum, and producing a continuous roll film record from each scanning device corresponding to the intensity of the radiant energy detected by the scanning device within its spectral range, characterised in that each film record is scanned by a flying spot scanner, the individual rasters of the flying spot scanner being controlled to achieve registration of the images of the film records.

The output signals of the scanning devices may also be recorded and the recorded data may subsequently be analysed to produce information on ground characteristics along the track scanned, that is on the geological composition and water content of the earth's crust and on vegetation.

This invention is particularly suitable for use in cooperation with data furnished from a satellite, such as, the Landsat C satellite. Hence, it is proposed that such areas as have been identified, for example, by the Landsat analysis, as having some extraordinary characteristic which requires further examination, can be overflown by aircraft equipped with apparatus operating according to this invention to gather data for a more definitive survey by multispectral analysis.

It has been found that good results can be achieved with the present invention by scanning the predetermined track with four scanning devices, such as four line-scanning devices which simultaneously scan along common linear zones or lines extending transversely to the track. The four line-scanning devices are mounted in such a way as to ensure that they scan along the same lines on the ground and each is arranged to have a different spectral response. They produce output films which facilitate further analysis of the ground characteristics along the track scanned beyond the satellite data currently available. The four identical scanning devices have a common index marker. The resolution of such scanning devices may, for example, be 1.5 milliradians, that is, from a height of 10,000 ft. above ground level, the resolution or width of the scan line will be 15 ft.

Flights by survey aircraft carrying apparatus operating in accordance with the invention may be made both at night and during daylight. After sunset, in the hot regions, the earth cools and different materials, having different characteristics, cool at different rates. From present knowledge, it would appear that the signatures of the earth's crust materials will be most marked about one hour after sunset, at which time it is proposed that survey flights may be made. Daylight flights may also be made and these will also provide a considerable quantity of information expecially in the early daylight hours, such as one hour after sunrise. Direct sun reflection and deep shadows may confuse some of the information obtained, but the extent of this will be determined by direct observation.

From another aspect, the invention consists in apparatus for remotely surveying the earth's crust, comprising a plurality of scanning devices arranged simultaneously to scan a track of predetermined width on the earth's surface and adapted to detect electromagnetic radiation from the earth's crust in the electromagnetic spectrum, each scanning device being responsive to a different spectral range within said electromagnetic spectrum and including means for producing film records corresponding to variations in the intensity of the radiant energy detected by the scanning device in its spectral range and a flying spot scanner associated with each film output of each scanning device whereby registration of the images of the film records may be achieved by adjusting the rasters of the flying spot scanners by their controls.

Preferably, the scanning devices are adapted to detect electromagnetic radiation in the 8–14 $\mu$m thermal infra-red waveband, and four identical scanning devices operating within this waveband have been found to give satisfactory results. The scanning devices are preferably standard line-scanning infra-red radiance detector units, such as, those marketed by the Infra-red Equipment Division of British Aerospace Dynamics Group of Hertfordshire, England, under the trade name of Linescan 214. So that each identical unit has a different spectral response, within the broad predetermined waveband, it is fitted with one of a series of interference filters covering the predetermined band. The filters may be passband filters which restrict the radiation impinging on their associated detectors to a plurality of contiguous spectral ranges spanning the broad waveband and corresponding to the number of scanning units. Alternatively, when pass-band filters result in an inadequate signal-to-noise ratio, rejection filters may be utilized which exclude radiations in different spectral ranges of the broad waveband from impinging on the detectors. In either event, the division of the broad waveband into a plurality of ranges or channels corresponding to the number of scanning units is on an equal output energy per channel basis for the particular infra-red detector being used when subjected to black body radiation equivalent to the earth's surface temperature.

The optimum design of the filters may be achieved by taking the response characteristic of the detector and designing the filter so that the sensitivities of the units, after the introduction of the filters, are approximately equal.

Additional recording means for recording the output signals from the detectors for subsequent analysis may be provided and may comprise a plurality of standard video magnetic tape recorders connected respectively to the detectors or, alternatively, a standard multi-channel video tape recorder. The output signals may also be supplied to a video processor for recording on photographic film.

The output signal from each detector may be monitored from a central control panel incorporating an oscilloscope for enabling adjustment of gain control. In the application of standard line-scanning units to this invention, the automatic gain controls normally included with such units are replaced by manual gain controls which are ganged together and are adjustable by a single manual control. In use, an observer accompanying the apparatus will manually adjust the gain of one of the units, so that its output signals provide a full grey scale coverage and it does not saturate, by monitoring the video display on the oscilloscope. The gain setting will remain constant for any one flight and will be automatically logged or recorded.

The apparatus may also include a photographic camera operating in the visible band of the spectrum. Its angular coverage is approximately matched to the angle of scan of the scanning devices. The same indexing or timing marks as are applied to the output signals of the scanners may be superimposed on the film for synchronisation purposes and in daylight flights this film may be used to assist the analysis of the output signals.

Figure 2:
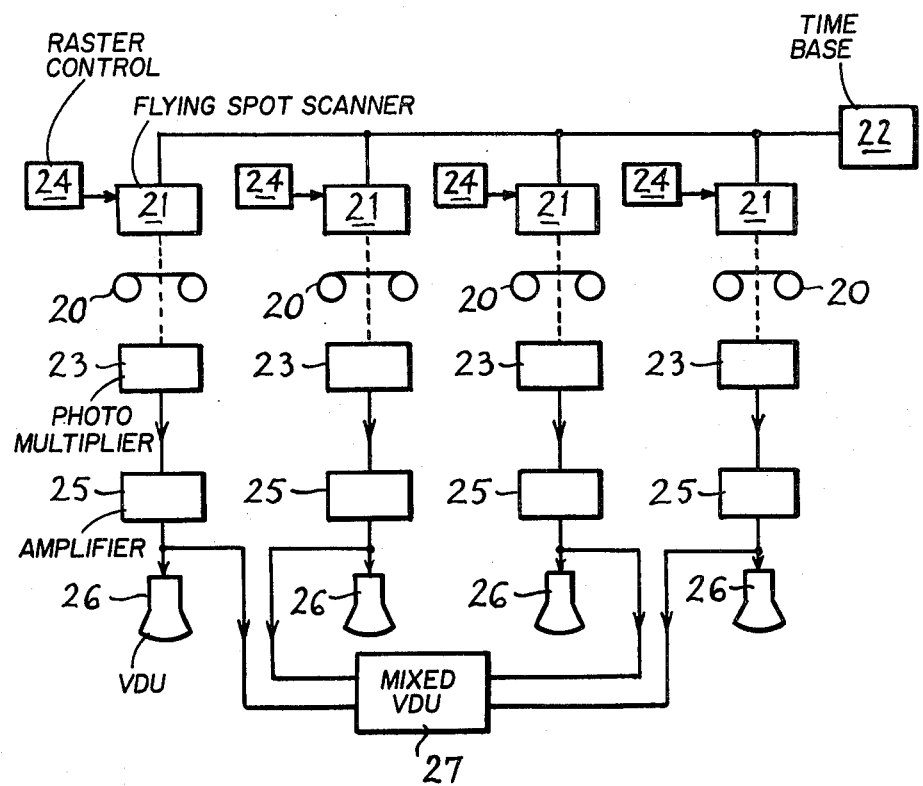

In order that the invention may be more readily understood, reference will now be made to the accompanying drawings in which FIGS. 1 and 2 schematically illustrate one embodiment of the invention.

Referring to the drawing, the surveying apparatus is installed in an aircraft 1 having stable flight characteristics and a navigational aid 2 programmed to control the flight path of the aircraft for the required survey. The apparatus includes four standard identical line-scanning infra-red radiance detector devices 3 arranged simultaneously to scan along common lines extending transversely to a track 4 of predetermined width overflown by the aircraft. These line-scanning devices are preferably Linescan 214 units as referred to above. Each Linescan unit includes a cadmium mercury telluride detector 5 which is cooled by a liquid nitrogen cooling pack 6 and is adapted to detect electromagnetic radiations from the earth's crust in the 8–14 $\mu$m thermal infra-red waveband of the elctromagnetic spectrum. Each unit 3 is fitted with one of four interference filters (not shown) covering the 8–14 $\mu$m waveband and adapting each scanning unit to respond to a different spectral range within that band. These filters may either be of the pass-band or the rejection type with the division of the full waveband between the scanning units being on an equal output energy basis for the particular detector 5 employed and when irradiated with black body radiation at the earth's surface temperature. When pass-band filters are used, the four detectors 5 respond respectively to the radiant energy in four contiguous spectral ranges spanning the full waveband. With rejection type filters, each detector responds to the radiant energy emitted within the full waveband with the exclusion of energy having wavelengths within one of a series of four contiguous spectral ranges spanning the waveband.

The output signals from the detectors 5 are supplied via lines 7 to a control panel 8 including a manual gain control for simultaneously adjusting the gain of all the units, and a channel selector for controlling transmission of the output signals to an oscilloscope 9. The output signals are also fed via lines 10 to four standard video magnetic tape recorders 11 which respectively record the output signals from the detectors. A video processor 12 is coupled to the recorders 11 via a line 13 so that the recorded output signals may be transposed onto a film or paper print-out. A time clock 14 associated with the control panel applies master timing or synchronising pulses to the detector output signals and to the video processor.

The assembly of scanning units 3 also includes a photographic camera 15 operating in the visible light band and having an angular coverage approximately matching that of the scanning units so as to produce a visible record of the ground being scanned. The photographic camera 15 is provided with ultra-violet and infra-red filters (not shown). The speed of the camera film is controllable from the control panel and master timing pulses from the time clock 14 are superimposed on the film for synchronising purposes.

Electrical power for the survey apparatus is supplied from the aircraft power pack 16. This directly supplies the DC current for operating the scanning units 3 and an invertor 17 converts the aircraft DC power into alternating current for operating the recorders 11 and video processor 12.

In order to carry out a survey, the aircraft 1 is navigated along successive tracks 4 over an area of the earth's surface to be surveyed, at a substantially constant height above ground level, for example, 10,000 ft, and at a substantially constant velocity. At a height of 10,000 ft, the width of each track 4 scanned by the scanning units 3 and the camera 15 is 34,800 ft. and the flight path of the aircraft is controlled so that the separation between the centre lines 18 of successive tracks is 20,000 ft. Hence, successively scanned tracks overlap. As the aircraft flies along each track, the scanning units 3 simultaneously scan along a succession of common lines or linear zones extending across the track and produce output signals identifying the intensity of the radiant energy emitted from the earth's surface within the spectral range of each unit and these output signals are recorded on magnetic tape and photographic film. As the scanning units do not have uniform responses, at some stage, the output signals may need correction and this can be achieved with the aid of recorded data supplied by the navigational aid 2. The corrected output signals, when integrated, represent pictorially the infrared spectral signatures of the earth's crust in the tracks scanned and may be analysed with the aid of an image classifier to provide data on the geological composition and other ground characteristics of the earth's surface and crust in the tracks. In daylight flights, the film record produced by the camera 15 can be used to assist in the analysis of the infra-red data.

It will be appreciated that during a surveying operation each of the scanning devices 5 will produce a filmed record of the variations in intensity of received radiation in the particular band in the electro-magnetic spectrum with which it is concerned. The rate of advance of the film through the scanning device together with the height of the aircraft above the ground and the aircraft's speed over the ground will determine the scale of the filmed data in relation to the terrain surveyed. However it will be appreciated that there will be unavoidable variations due to manufacturing tolerances between each of the film transport mechanisms of the scanning devices. However the nature of the data being recorded is such that it is extremely important for a satisfactory analysis of the data that the four filmed records from the scanners can be put exactly into register.

This is achieved by the arrangement shown in FIG. 2 of the drawings in which the four films, shown at 20 are examined by a complex of four flying spot scanners 21. The films 20 are advanced beneath the scanner 21 in exact synchronism, preferably from a common drive, and the four scanners are driven from a common time base 22. The transmitted light spot from each scanner 21, modulated by its passage through the associated film 20 is intensified in a suitable intensification stage which may comprise a photomultiplier 23. The four images so produced are viewed by an observer who will be able to see whether the images are in registration or not. Assuming, as is likely, that at least some of the images will be out of registration due to manufacturing tolerances as previously mentioned it is a relatively simple matter for the observer to correct the registration by adjusting the individual rasters of the scanners 21 on a line and frame time basis by the controls 24 of the scanners 21.

The output of each photomultiplier 23 is taken to an amplifier 25 and the result displayed on a visual display unit 26. The images displayed on the VDU's 26 are scanned by an operator who notes indication that there is lack of registration between the various displayed images. The four VDU's are connected to a mixed visual display unit 27 having two screens which can display any two of the images shown on the VDU's 26.

In order to correct registration the operator selects one of the displayed images to act as a master and transfers this to one of the screens of the unit 27. He then calls up the other three channels in turn and brings them one-by-one into registration with the selected master channel. Once registration has been achieved the recorded and registered signals can be digitised in a known manner for subsequent analysis and use.

Whilst a particular embodiment has been described, it will be understood that modifications can be made without departing from the scope of the invention.

What is claimed is:

1. A method for remotely surveying the earth's crust, comprising the following steps:
    (a) advancing a plurality of electromagnetic scanning devices along a known path at a known height and velocity above the earth's surace;
    (b) simultaneously scanning a track of known width on the earth's surface with said scanning devices;
    (c) detecting with said scanning devices electromagnetic radiation received from the earth's crust along said scanned track, each scanning device responding to a different spectral range within a predetermined waveband of the electromagnetic spectrum,
    (d) producing a film record from each scanning device corresponding to the intensity of the radiant energy detected by the scanning device within its spectral range, and
    (e) scanning each said film record with a flying spot scanner and adjusting the individual rasters of said flying spot scanners to achieve registration of images of said film records produced by said flying spot scanners.

2. A method according to claim 1, in which the flying spot scanners are driven from a common time base.

3. Apparatus for remotely surveying the earth's crust comprising in combination:
    (a) means mounting a plurality of scanning devices for simultaneously scanning a track of predetermined width on the earth's surface;
    (b) each said scanning device being responsive to a different spectral range within a predetermined waveband of the electromagnetic spectrum;
    (c) each said scanning device including detecting means for sensing electromagnetic radiation within its spectral range and producing output signals corresponding to the intensity of said detected radiation, and means for directing said electromagnetic radiation received from said track on the earth's surface onto said detecting means;

(d) film recording means operatively connected to said detecting means to produce a film record of each said output signals; and (e) registration means for examining said film records and producing registration thereof, said registration means including flying spot scanners adapted respectively to scan said film records and having rasters individually adjustable to achieve registration of images of said film records produced by said flying spot scanners.

4. Apparatus according to claim 3, comprising four scanning devices responsive to electromagnetic radiation within different spectral ranges in the 8–14 μm thermal infra-red waveband.

5. Apparatus according to claim 4, wherein the scanning devices are identical line-scanning infra-red radiance detector units, each unit being fitted with a selected interference filter so that each unit has a different spectral response within the predetermined waveband.

6. Apparatus according to claim 5, wherein the division of the predetermined waveband into a plurality of spectral ranges corresponding to the number of scanning units is on an equal output energy per channel basis for the particular infra-red detector being used when subjected to black body radiation equivalent to the earth's surface temperature.

7. Apparatus according to claim 3 wherein the flying spot scanners are connected to a common time base.

8. Apparatus according to claim 7 wherein additional recording means for recording the output signals from the detecting means for subsequent analysis are provided, the additional recording means comprising a plurality of standard video magnetic tape recording means connected respectively to the detecting means.

9. Apparatus according to claim 8, including means for monitoring the output signal from each detecting means including an oscilloscope for enabling adjustment of gain control, and wherein the scanning devices incorporate manual gain controls which are ganged together and are adjustable by a single manual control.

10. Apparatus according to claim 9 including a photographic camera operating in the visible band of the spectrum and having an angular coverage approximately matched to the angle of scan of the scanning devices, and further including means for applying indexing marks to the output signals of the scanning devices and the camera film for synchronisation purposes.

* * * * *